United States Patent [19]
Casey

[11] Patent Number: 4,712,130
[45] Date of Patent: Dec. 8, 1987

[54] CHROMINANCE SIGNAL FREQUENCY CONVERTER AS FOR A PIX-IN-PIX TELEVISION RECEIVER

[75] Inventor: Robert F. Casey, Oradell, N.J.

[73] Assignee: RCA Corporation, Princeton, N.J.

[21] Appl. No.: 901,631

[22] Filed: Aug. 29, 1986

[51] Int. Cl.$^4$ ............................................. H04N 5/265
[52] U.S. Cl. ....................................... 358/22; 358/183
[58] Field of Search ................................... 358/22, 183

[56] References Cited

U.S. PATENT DOCUMENTS

| | | | |
|---|---|---|---|
| 4,063,280 | 12/1977 | Hattori et al. | 358/22 |
| 4,134,128 | 1/1979 | Hurst | 358/22 |
| 4,204,227 | 5/1980 | Gurley | 358/138 |
| 4,282,546 | 8/1981 | Reitmeier | 358/22 |
| 4,367,484 | 1/1983 | Kuroyanagi et al. | 358/22 |
| 4,656,515 | 4/1987 | Christopher | 358/22 |

*Primary Examiner*—Michael A. Masinick
*Attorney, Agent, or Firm*—Paul J. Rasmussen; Eric P. Herrmann; Kenneth N. Nigon

[57] ABSTRACT

A pix-in-pix television signal processing system develops a composite video pix-in-pix signal representing a reduced-size auxiliary image insert in a full-sized main image. The auxiliary video signal is separated into luminance and chrominance components by filtering circuitry. The luminance signal is subsampled in a ratio of one to four and the chrominance signal, which is composed of two color difference signals modulating quadrature phase related subcarrier signals, is applied to circuitry which interpolates between selected pairs of samples to develop a frequency converted chrominance signal, representing the two quadrature phase related color difference signals modulating quadrature phase related subcarrier signals having frequencies that are one-quarter the frequency of the original subcarrier signal. The frequency converted chrominance signal and subsampled luminance signal are combined to generate a composite video signal representing the reduced-size auxiliary image. This signal is combined with the main signal to develop the composite video pix-in-pix signal.

6 Claims, 8 Drawing Figures

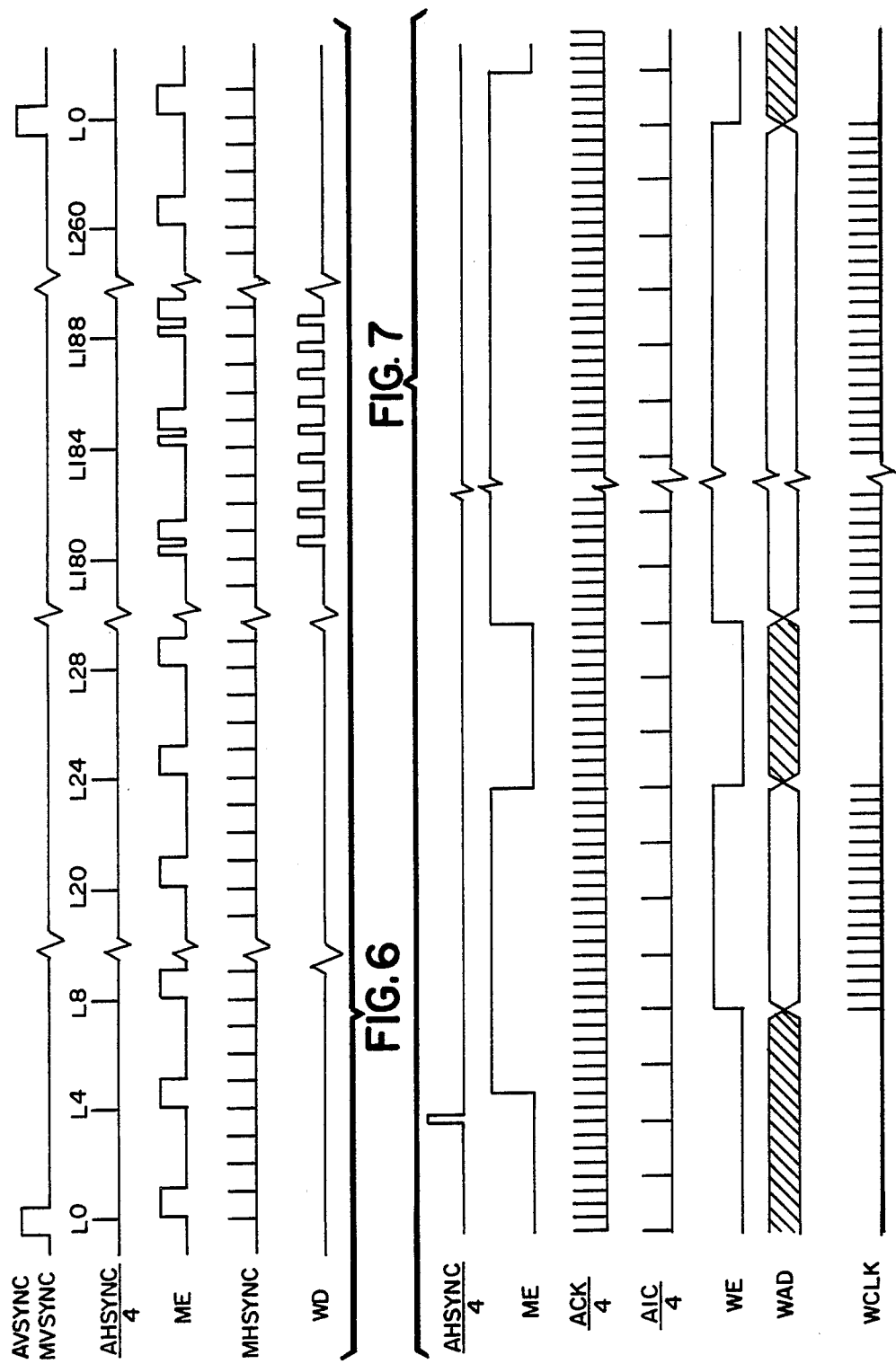

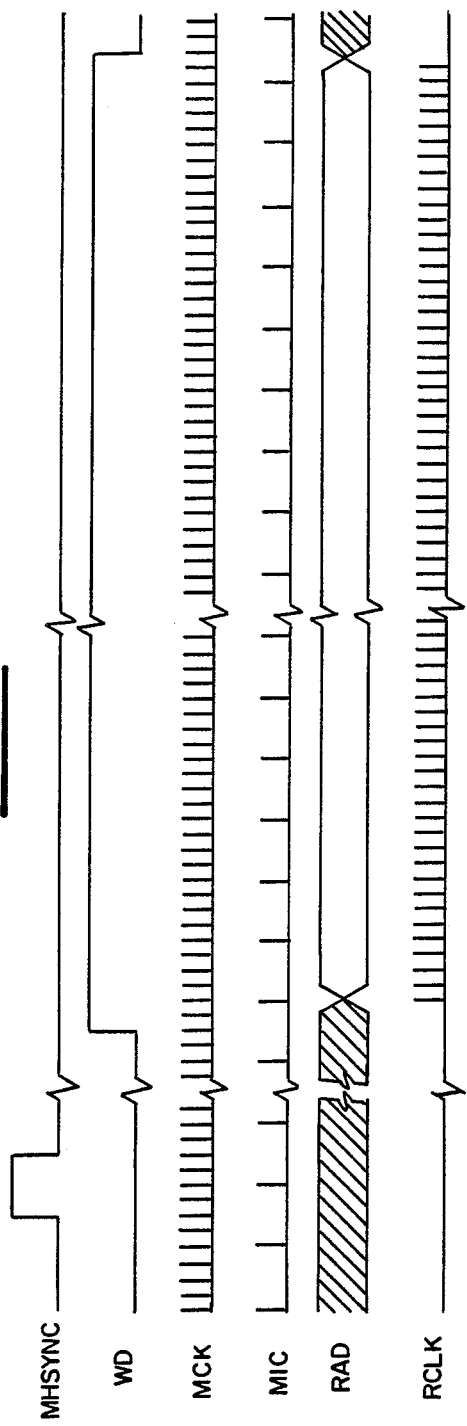

CHROMINANCE SIGNAL FREQUENCY CONVERTER AS FOR A PIX-IN-PIX TELEVISION RECEIVER

The present invention relates to circuitry for processing the chrominance signal component of a composite video signal to develop a sampled data chrominance signal having a frequency shifted color subcarrier.

In television receivers which include a picture within a picture (pix-in-pix) feature and in video signal processing systems for video recording or teleconferencing, it may be desirable to process a full bandwidth composite video signal into a reduced bandwidth signal. This reduced bandwidth signal is advantageous because it uses fewer memory storage locations in a pix-in-pix system, and may be more economical to record or transmit than a full bandwidth signal.

The process of reducing the bandwidth of composite video signals is complicated by the structure of the signals. All major television systems (i.e. NTSC, PAL and SECAM) have composite video signals in which the color information signals modulate subcarrier signals that are within the frequency spectrum of the baseband luminance signals. These modulated color information signals are commonly referred to as chrominance signals. In the NTSC system, for example, the I and Q color difference signals, which have respective bandwidths of 1.2 MHz and 0.5 MHz, modulate quadrature phase related 3.58 MHz subcarrier signals to produce a chrominance signal. This chrominance signal is combined with a luminance signal, having a frequency spectrum from 0 to 4.2 MHz, to develop an NTSC composite video signal.

The embodiment of the invention described below is in the context of a system which combines a reduced bandwidth (auxiliary) composite video signal from one source with a full bandwidth (main) signal from another source to produce a composite video signal which may be processed by conventional television signal processing circuitry to produce a pix-in-pix display. In the combined signal, samples representing lines of the auxiliary signal are substituted for the samples occupying a selected portion of selected horizontal lines of the main image. In this manner, the auxiliary image is displayed as a reduced-size inset in the full-sized main image.

The most direct method for developing the reduced bandwidth auxiliary signal is to subsample the full bandwidth auxiliary composite video signal. To preserve the continuity of the color subcarrier signal, it is desirable to subsample the full bandwidth signal in a manner which omits samples corresponding to complete cycles of the color subcarrier signal. To achieve a four-to-one reduction, for example, samples of the composite video signal corresponding to three out of every four cycles of the color subcarrier signal would be discarded. This method is described, for example, in U.S. Pat. No. 4,134,128 entitled "Television Picture Size Altering Apparatus" which is hereby incorporated by reference.

This method is not practical for use in a pix-in-pix system since, for reduction ratios greater than two-to-one, a relatively large amount of luminance information is discarded by the subsampling process, which may produce undesirable levels of distortion in the auxiliary image.

One solution to this problem is disclosed in U.S. Pat. No. 4,063,280 entitled "Chroma Signal Processing System" which is hereby incorporated by reference. The system described in this patent separates the luminance and chrominance signal components from the auxiliary composite video signal, separately subsamples the two signals and combines the subsampled signals to generate a composite subsampled signal. The luminance signal is subsampled such that, to achieve a one to N reduction, one sample from the full bandwidth signal is used to generate the reduced signal and the next N−1 samples are ignored. The chrominance signal, however, is subsampled in a less regular pattern which preserves the continuity of the color subcarrier while effecting a one to N reduction over each line of samples. This method of subsampling produces a less distorted inset image than the first described method, however, some distortion may occur if a comb filter is used to separate the luminance and chrominance components from the combined main and auxiliary composite video signal. This distortion occurs because the luminance and chrominance samples of the auxiliary signal on successive lines for a line comb filter, or successive frames for a frame comb filter, which should correspond, may not correspond to like pixels or sampling points. This distortion may appear in the inset image as a smearing of the edges of colored objects or as spurious bright or dark dots in the image.

SUMMARY OF THE INVENTION

The present invention is embodied in circuitry for shifting the frequency of a modulated chrominance signal to develop a subsampled chrominance signal having a substantially uniform sampling interval. A sampled data chrominance signal is applied to circuitry which interpolates between selected pairs of samples to generate a plurality of interpolated sample values. These sample values are applied to circuitry which selects samples from among the interpolated samples and the uninterpolated chrominance signal samples to develop a sampled data signal representing a frequency-shifted modulated chrominance signal.

BRIEF DESCRIPTION OF THE DRAWINGS

FIGS. 6, 7 and 8 are timing diagrams useful in describing the operation of the television signal processing system shown in FIG. 1.

DETAILED DESCRIPTION

Figure 1:
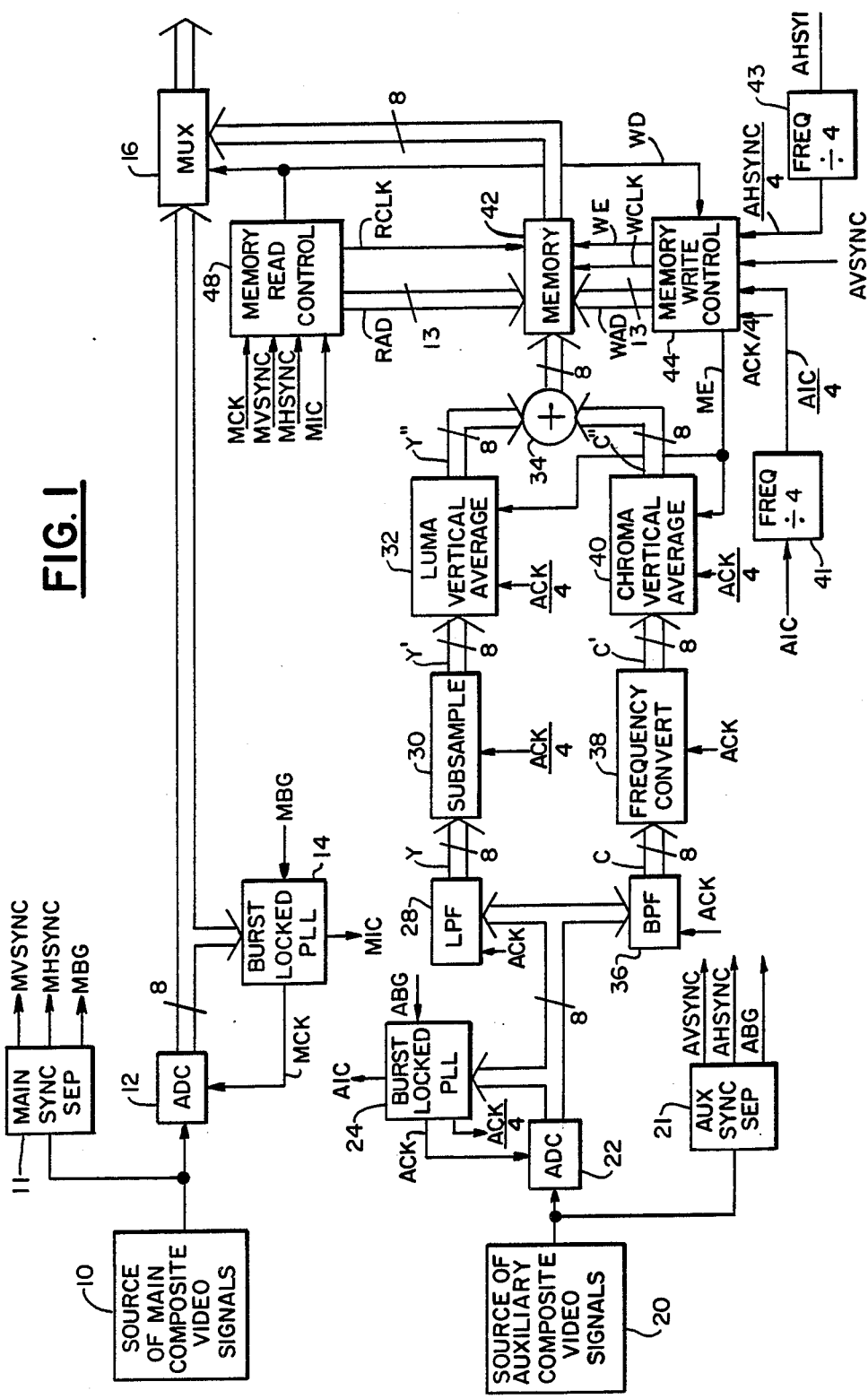
FIG. 1 is a block diagram of a portion of a television signal processing system which includes the present invention.

In the drawings, broad arrows represent busses for multiple-bit parallel digital signals and line arrows represent connections for conveying analog signals or single bit digital signals. Depending on the processing speed of the devices, compensating delays may be required in certain of the signal paths. One skilled in the art of digital signal processing circuit design would know where such delays would be needed in a particular system.

The embodiment of the invention described below is in the context of a video signal processing system that combines two independent composite video signals to produce a composite video signal, which, when processed by a conventional television receiver produces a picture in which the image defined by one signal is displayed as a reduced size inset in the image defined by the other signal. The system described below may, for example, be included in a consumer video tape recorder (VTR) to produce a composite signal for which the signal from the tape produces the full sized image and the signal received via the tuner produces the reduced size inset image. It is also contemplated that this system may be incorporated in a separate set-top box having two independent tuners or in the television receiver itself.

In FIG. 1, a source of main composite video signals 10 provides signals representing the full sized image to the main synchronization signal separation circuitry 11. The circuitry 11, which may be of conventional design, separates the main horizontal and vertical synchronization signals, MHSYNC and MVSYNC, respectively, from the main composite video signals and generates a main burst gate signal, MBG consisting of one pulse per line coinciding with the burst interval of the main signal. These signals are used by the circuitry described below. The signal provided by the source 10 is also applied to an analog to digital converter (ADC) 12. The ADC 12 samples the signals applied to its input port at instants determined by a sampling clock signal, MCK, to develop digital samples representing the main composite video signal. These samples are applied to a burst-locked phase-locked-loop (PLL) 14. The PLL 14, which may be of conventional design, is responsive to the burst gate signal, MBG, for generating the clock signal MCK. The signal MCK has a nominal frequency of $4f_c$, four times the frequency of the color subcarrier, $f_c$, and is locked in phase to the color reference burst signal component of the main composite video signal. Since the ADC 12 generates samples in synchronism with a burst locked clock signal having a frequency of $4f_c$, the chrominance signal components of the samples may be represented by a sequence of values representing two color difference signals, for example, I and Q. This sequence is: $+I, -Q, -I, +Q, +I$ ... etc., where the plus and minus signs indicate sampling phase, not sample polarity. The burst locked PLL 14 also generates a signal MIC which has a frequency of $f_c$ and has pulses coinciding with the $+I$ values in this sequence.

The samples developed by the ADC 12 are applied to a multiplexer 16 which combines these samples with samples representing the reduced size auxiliary image to develop samples representing the pix-in-pix signal. The circuitry which processes the auxiliary signal to develop the samples applied to the multiplexer 16 is described below.

A source of auxiliary composite video signals 20 provides composite video signals to the auxiliary synchronization signal separation circuitry 21. The circuitry 21, which may be identical to the circuitry 11, described above, separates the auxiliary horizontal and vertical synchronization signals, AHSYNC and AVSYNC, respectively, from the auxiliary composite video signals and generates an auxiliary burst gate signal, ABG, consisting of one pulse per line coinciding with the burst interval of the auxiliary signal. These signals are used by the circuitry described below. The composite video signal provided by the source 20 is also applied to an ADC 22 which, responsive to a clock signal ACK, develops digital samples representing the auxiliary composite video signal. The samples generated by the ADC 22 are applied to a burst-locked PLL 24. The PLL 24, which may be of conventional design, is responsive to the auxiliary burst gate signal, ABG, for generating the clock signals ACK and ACK/4. The signals ACK and ACK/4 have nominal frequencies of $4f_c$ and $f_c$ and are phase locked to the color reference burst component of the auxiliary composite video signal. The PLL 24 also generates a signal AIC which has a nominal frequency of $f_c$ and has pulses which coincide with the $+I$ sampling phase of the chrominance signal component of the auxiliary composite video signals. The samples generated by the ADC 22 are applied to a low-pass filter 28 which may, for example, have a frequency characteristic pass band from 0 to 1 MHz within the frequency spectrum of the auxiliary composite video signal. The filter 28 has two functions, to separate the luminance component from the auxiliary composite video signal and to process the separated luminance signal to eliminate signal components which may introduce aliasing distortion when the auxiliary luminance signal is subsampled. In the present embodiment of the invention, the auxiliary luminance signal, Y, provided by the low-pass filter 28 is subsampled, by the subsampling circuitry 30, in a ratio of one to four synchronous with a clock signal ACK/4, provided by the PLL 24. The Nyquist limit frequency or folding frequency for the subsampled signal is $f_c/2$ or 1.8 MHz in the NTSC system. By passing only those luminance signal components occupying the band of frequencies between 0 and 1 MHz, the filter 28 ensures that the subsampled luminance signal, Y', provided by the circuitry 30 is substantially free of aliasing distortion signals.

The signal Y' is applied to luminance vertical averaging circuitry 32 which may, for example, average the corresponding sample values from four consecutive subsampled horizontal lines to develop a horizontally and vertically subsampled luminance signal, Y".

Figure 2:
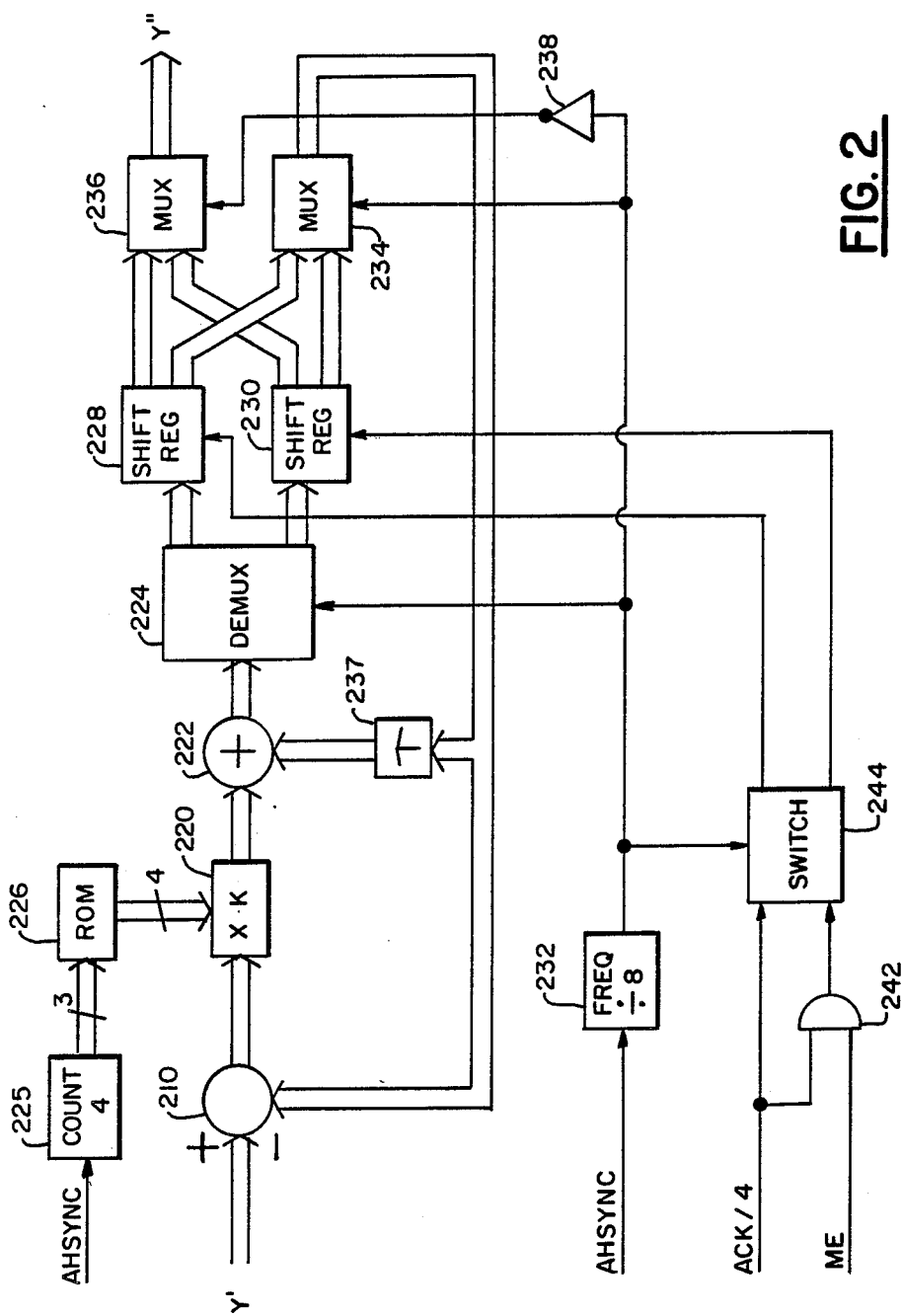
FIG. 2 is a block diagram of luminance signal vertical averaging circuitry which may be used in the television signal processing system shown in FIG. 1.

FIG. 2 is a block diagram of luminance signal vertical averaging circuitry suitable for use with the present embodiment of the invention. The circuitry shown in FIG. 2 acts simultaneously as a vertical averaging filter and as a buffer for writing the averaged samples into the pix-in-pix field memory 42. To do this, the vertical averaging filter employs two shift registers 228 and 230 each of which is alternately used for averaging the lines of samples and for buffering a line of averaged samples to be written into the memory. The lines of samples are averaged as follows. The first line is stored in one of the shift registers unmodified. As each sample of the second line is applied to the filter, the corresponding sample from the first line is subtracted from it and the difference between the sample values is scaled by one-half. The corresponding sample from the first line is then added to this scaled difference value and the resulting sample is stored in the shift register. When the samples of the third line are applied to the filter, the corresponding samples from the shift register are subtracted from the samples of the third line and the difference between these sample values is scaled by $\frac{2}{3}$. The corresponding sample from the shift register is then added to this scaled difference value and the resultant sample is stored in the shift register. This process is repeated for the fourth line of samples except that the difference between the sample values of the fourth line and the sample values from the shift register is scaled by ¼. This method of averaging uses shift registers having the same bit-width as the samples being averaged. While the values produced are not an exact average of the four lines of samples, the approximation has been found to be subjectively pleasing.

In FIG. 2, samples of the subsampled luminance signal, Y', are applied to the minuend input port of the subtracter 210. Samples from the shift register 228 or 230, whichever is currently conditioned to operate in the signal averaging mode are coupled, via the multiplexer 234, to the subtrahend input port of the subtracter 210. During the successive line intervals of the averaging process, the samples provided by the shift register 228 (230) represent the first line, the average of the first and second lines and the average of the first three lines, respectively.

The samples developed by the subtracter 210 are applied to the sample scaler 220 which multiplies the difference samples by the appropriate scale factor K. The scale factors, K, are developed by the modulo 4 counter 225 and the read only memory (ROM) 226 responsive to the auxiliary horizontal synchronization signal, AHSYNC. Each pulse of the signal AHSYNC increments the modulo 4 counter 225. The count value developed by this counter is applied, as an address, to the ROM 226. The ROM 226 is programmed to provide output values of 1, ½, ⅔ and ¼ (the scale factors K), when the values 0, 1, 2 and 3, respectively, are applied to its address input port.

The samples developed by the sample scaler 220 are applied to one input port of an adder 222. Samples from the shift register 228 (230) are coupled to the other input port of the adder 222 via the multiplexer 234 and a delay element 237. The delay element 237 compensates for the processing time through subtracter 210 and sample scaler 220 so the same sample values that were applied to the subtrahend input of the subtracter 210 are applied to the adder 222. The adder 222 sums the values of the scaled and delayed samples and applies the resulting samples to a demultiplexer 224.

The demultiplexer 224 is controlled by a signal having a fifty-percent duty cycle and a frequency, $f_H/8$, that is substantially equal to one-eighth of the frequency, $f_H$, of the auxiliary horizontal line synchronizing signal AHSYNC. The control signal for the demultiplexer 224 is generated by applying the signal AHSYNC to the frequency dividing circuitry 232.

The samples generated by the adder 222 are applied to the shift registers 228 and 230 in alternating intervals of four horizontal line periods. When the control signal developed by the frequency divider 232 is a logic one, the demultiplexer 224 is conditioned to apply samples to the shift register 228 and when the control signal is a logic zero the demultiplexer is conditioned to apply samples to the shift register 230.

The shift registers 228 and 230 are identical. Each may, for example, contain 227 storage locations, enough to hold one line of samples representing the subsampled luminance signal. The clock signals for the shift registers 228 and 230 are provided by the switch 244. The switch 244 is coupled to receive the clock signal ACK/4 at a first input port and the logic AND of the clock signal ACK/4 and the memory enable signal, ME, developed by the AND gate 242, at a second input port. Switch 244 is controlled by the signal developed by the frequency divider 232 to provide the clock signal applied to its first input port to the shift register 228 or 230, whichever is being used to average the lines of subsampled luminance signal, and to provide the clock signal applied to its second input port to the other shift register.

The output ports of both of the shift registers 228 and 230 are connected to the two input ports of each of the two multiplexers 234 and 236. The control signal developed by the frequency divider 232 is applied to the control input terminal of the multiplexer 234 and, through the inverter 238, to the control input terminal of the multiplexer 236. The multiplexer 234 is conditioned by this control signal to apply samples from the shift register 228 or 230, which is in the averaging mode, to the subtracter 210 and delay element 237. Concurrently, the multiplexer 236 is conditioned by the inverse of this control signal to provide samples from the other shift register, 230 or 228, as the signal Y", to the adder 34 (in FIG. 1). As the samples are transferred from the output port of the shift register 230 or 228, acting in the buffer mode, zero value samples are transferred into the input port of the shift register. Adder 34 sums the averaged luminance samples with averaged chrominance samples to develop samples of a composite video signal representing the reduced size auxiliary image for application to the pix-in-pix field memory 42. The averaged chrominance samples are developed by the circuitry described below.

Referring to FIG. 1, samples representing the auxiliary composite video signal are applied by the ADC 22 to a band-pass filter 36. The filter 36 may, for example, have a frequency characteristic pass-band from 3 MHz to 4 MHz within the range of frequencies occupied by the auxiliary composite video signal. The filter 36 has two functions, to separate the chrominance signal components, C, from the sampled auxiliary composite video signal and to condition the separated chrominance signal, by limiting its bandwidth, to substantially eliminate signal components which may cause aliasing distortion when the signal C is processed by the chrominance signal frequency converter 38.

Figure 3:
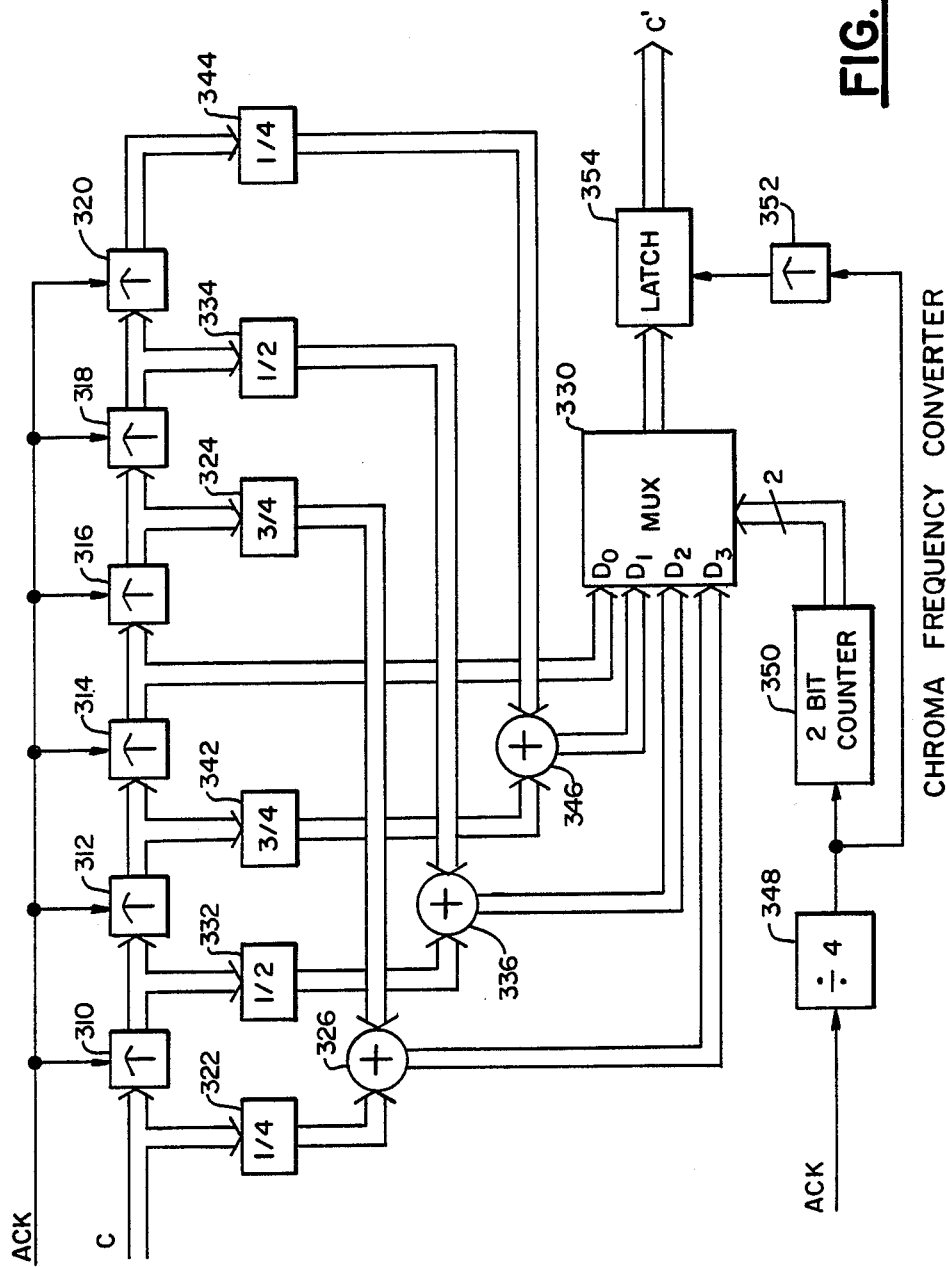
FIG. 3 is a block diagram of chrominance signal frequency conversion circuitry, embodying the present invention, which may be used in the television signal processing system shown in FIG. 1.

FIG. 3 is a block diagram showing circuitry which may be used as the chrominance signal frequency converter 38. The digital chrominance signal C is applied to a delay element 310, the first of six serially connected delay elements 310, 312, 314, 316, 318 and 320. Each of these delay elements is responsive to the clock signal ACK to delay the sample applied to its input port by an amount of time substantially equal to one period of the clock signal. The samples available at the output port of the delay element 314 are applied to the data input port $D_O$ of a multiplexer 330. The undelayed input samples are scaled by a factor of ¼ in the scaling circuitry 322 and the samples provided by delay element 316 are scaled by a factor of ¾ in the scaling circuitry 324. The samples provided by the scaling circuits 322 and 324 are summed by the adder 326 and the resultant samples are applied to the $D_1$ input port of the multiplexer 330. The samples from the delay elements 312 and 318 are scaled by factors of ½ in respective scaling circuits 332 and 334 and the scaled samples are summed by an adder 336 which generates samples applied to the $D_2$ input port of the multiplexer 330. The samples from the delay elements 312 and 320 are scaled by respective factors of ¾ and ¼ by the scaling circuits 342 and 344 respectively and the scaled samples are summed by the adder 346 which develops samples applied to the $D_3$ input port of the multiplexer 330. The multiplexer 330, responsive to a control signal, sequentially couples its input ports $D_0-D_3$ to its output port at a rate one-fourth of the frequency of the clock signal ACK.

The control signal for the multiplexer 330 is generated by frequency dividing the clock signal ACK by four in the circuitry 348 and using the output signal of the circuitry 348 as the input signal to the modulo 4 counter 350. The frequency divided clock signal increments the value held by the counter in the cycle 0, 1, 2, 3, 0, etc. This counter value is applied as the control signal of the multiplexer 330. The counter values 0, 1, 2 and 3 condition the multiplexer 330 to provide the samples applied to the respective input ports $D_0$, $D_1$, $D_2$ and $D_3$ at its output port. These samples are stored in a latch 354 in synchronism with a clock signal provided by the delay element 352. This clock signal is the clock signal provided by the frequency divider 348 compensated for the processing delays through the counter 350 and multiplexer 330. The signal, C', available at the output terminal of the latch 354 is a sampled data signal representing the frequency converted chrominance signal.

Figure 5:
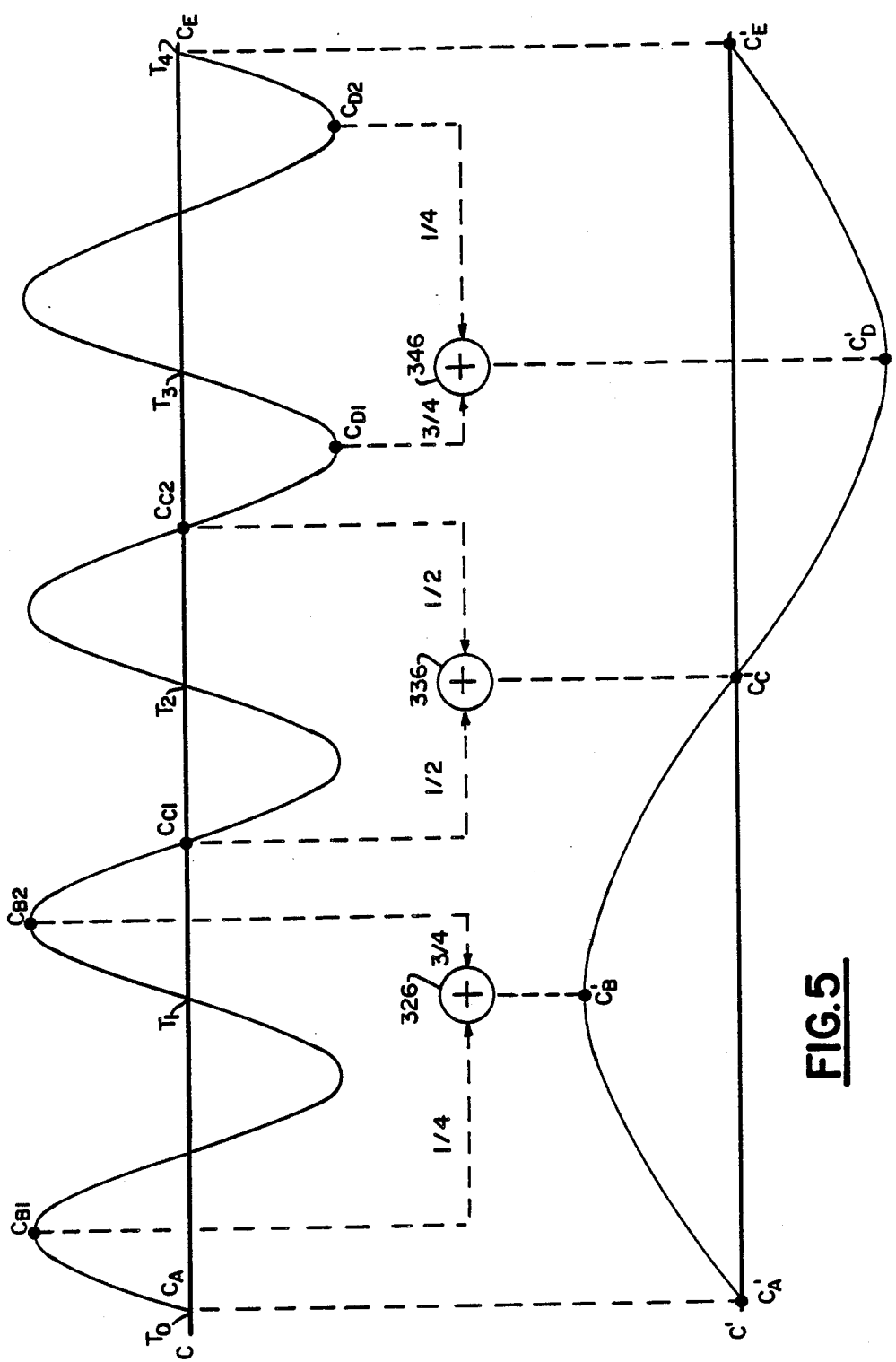
FIG. 5 is an amplitude versus time waveform diagram that is useful in describing the operation of the chrominance signal frequency conversion circuitry shown in FIG. 3.

To understand the operation of the frequency converter 38, consider the waveform diagrams shown in FIG. 5. The waveform C represents the chrominance signal applied to the frequency converter 38 and the waveform C' represents the frequency converted chrominance signal provided by the converter 38. Since the frequency of the clock signal ACK is nominally four times the frequency of the auxiliary color subcarrier frequency, at every fourth clock pulse, the samples available at the respective output ports of the delay elements 310–320 are samples taken at the same respective sampling phases. The adders 326, 336 and 346 combine samples having corresponding sampling phases to generate interpolated samples representing samples taken at the different sampling phases. The multiplexer 330 cycles among the samples provided by the delay element 314 and the adders 326, 336 and 346 to generate a signal C' having consecutive sampling phases that correspond to the consecutive sampling phases of the original chrominance signal C.

At time $T_0$, the value held by the counter 350 is zero and the sample $C_A$, provided by the delay element 314 is supplied by the multiplexer 330 to the latch 354 as the sample $C_A'$ of the output signal C'. After four periods of the clock signal ACK, at time $T_1$, the value held by the counter 350 is one and the sum of the scaled samples $C_{B1}$ and $C_{B2}$ from the adder 326 is provided by the multiplexer 330 as the sample $C_B'$. The sample $C_C'$ provided by the multiplexer at time $T_2$ is the sum of the scaled samples $C_{C1}$ and $C_{C2}$ as developed by the adder 336, the sample $C_D'$, provided by the multiplexer 330 at time $T_3$ is the sum of scaled samples $C_{D1}$ and $C_{D2}$ developed by the adder 346, and the sample $C_E'$ provided by the multiplexer 330 at time $T_4$ is the sample $C_E$ available at the output terminal of the delay element 314.

Functionally, the chrominance signal frequency converter 38 converts the sampled data signal, C, which represents the I and Q color difference signals modulating quadrature phase related color subcarrier signals having frequencies of $f_c$, into a sampled data signal C' which represents the same I and Q color difference signals modulating quadrature phase related subcarrier signals having frequencies of $f_c/4$, one-fourth the frequency of the original subcarrier signals. Moreover, the samples of the converted chrominance signal C' occur at intervals which closely correspond to the sampling intervals of the subsampled luminance signal Y'.

The frequency converted chrominance signal, C', is applied to chrominance signal vertical averaging circuitry 40. The circuitry 40 is similar to the luminance signal vertical averaging circuitry 32 described above. It averages four consecutive lines of samples of the frequency converted chrominance signal to develop a signal C" which represents the chrominance signal components of the reduced size image.

Figure 4:
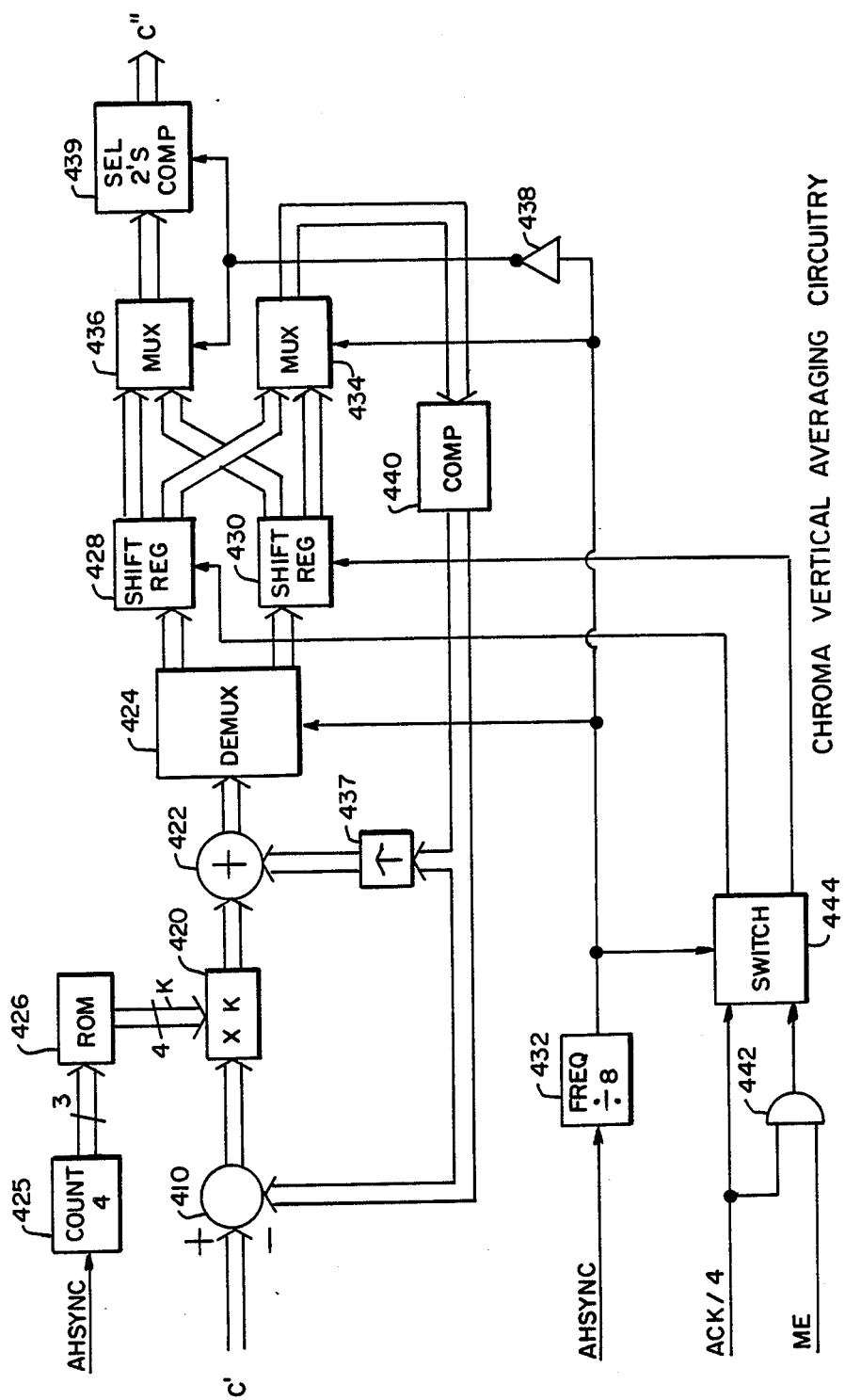
FIG. 4 is a block diagram of chrominance signal vertical averaging circuitry which may be used in the television signal processing system shown in FIG. 1.

FIG. 4 is a block diagram of circuitry which may be used for the chrominance signal vertical averaging circuitry 40. The circuitry shown in FIG. 4 is similar to the circuitry shown in FIG. 2. The only structural differences between the circuitry shown in the two FIGS. are the addition of a sample complementer 440, in the feedback path from the multiplexer 434 to the subtracter 410 and delay element 437, and the addition of selective sample complementing circuitry 439 at the output port of the multiplexer 436.

The sample complementer 440 inverts the polarity of the samples provided by the multiplexer 434. It is desirable in this embodiment of the invention to complement the sample values of the stored line before averaging them with the incoming sample values because, in the NTSC system, the phase of the color subcarrier signal changes by 180° from line to line. Consequently, the polarity of corresponding chrominance signal samples on any two successive lines is opposite. By complementing the stored samples before averaging them with the incoming samples from the next horizontal line, the sample complementer 440 ensures that the samples stored in the shift registers 428 and 430 represent the average magnitudes of the chrominance signal samples from four consecutive horizontal lines of the auxiliary signal. The phase of the stored samples corresponds to the phase of the last line of the four lines of samples that were averaged and, so, the signal represented by the lines of samples provided by the multiplexer 436 do not change in phase by 180° from line to line. In addition to averaging the chrominance samples from consecutive lines of the auxiliary video signal, the circuitry shown in FIG. 4 also acts to comb filter the chrominance samples to substantially remove any spurious high frequency luminance signal components therefrom.

The selective sample complementing circuitry 439 is controlled by the signal provided by the inverter 438 to alternately complement and pass uncomplemented the lines of samples provided by the multiplexer 436. This simulates a 180° phase change in the chrominance signal from line to line.

The signal C" provided by the chrominance signal vertical averaging filter is applied to the adder 34 which, as set forth above, combines the horizontally and vertically subsampled luminance and chrominance signal components to develop a composite video signal representing the reduced size auxiliary image. This signal is applied to the pix-in-pix field memory 42 under the control of the memory write control circuitry 44.

The memory write control circuitry 44, may, for example, generate a thirteen-bit address signal and a write enable signal, WE, which are applied to the pix-in-pix field memory 42, and the memory enable signal ME which is applied to the luminance and chrominance vertical averaging circuits 32 and 40. To generate these signals, the memory write control circuitry 44 is responsive to the clock signal ACK/4, the auxiliary vertical synchronization AVSYNC, a signal AHSYNC/4 which is generated by frequency dividing the auxiliary horizontal synchronization signal AHSYNC by four in the frequency dividing circuitry 43, and a signal AIC/4 which is generated by frequency dividing the auxiliary I clock signal, AIC, by four in the frequency dividing circuitry 41. The circuitry 44 is also responsive to a write disable signal, WD, generated by memory read control circuitry 48, to suspend reading samples from the vertical averaging circuits 32 and 40 and to suspend memory write operations while data is being read from the memory 42. FIGS. 6 and 7 are timing diagrams which show the relationship between the input and output signals of the memory write control circuitry 44.

The memory enable signal, ME, is in a logic one state after the leading edge of each pulse of the signal AHSYNC/4 for an amount of time sufficient to read all of the samples from the buffer memories of the vertical averaging circuits 32 and 40. This signal may not be continuous, it may be interrupted if the WD signal, provided by the memory read control circuitry 48 suspends the writing of data into the memory 42 during a memory read operation.

The operation of writing the data provided by the adder 34 into the pix-in-pix field memory 42 is controlled by the write address signal, WAD, and the write enable signal WE. The write address signal may, for example, consist of a six-bit row address and a seven-bit column address. The row address and column address components of the write address signal are incremented in response to the signals ACK/4 and AHSYNC/4, respectively, when the write enable signal, WE, is a logic one. The signal WE is zero when the signal WD is one and is controlled by the signals AHSYNC/4, AVSYNC and ACK/4 to inhibit the storage of lines of samples in each field which occur during the vertical blanking interval and the samples on each line which occur during the horizontal blanking interval. Consequently, only those samples which represent active video information are stored in the memory 42. In addition, the memory write control circuitry 44 is responsive to the frequency divided I clock signal AIC/4 so that the first sample on the first line of the stored fields has a chrominance signal component corresponding to the +I sampling phase. The first sample of the remaining lines in the field alternate between having chrominance components at the −I and +I sampling phases. One skilled in the art of digital signal processing circuit design would be able to build suitable memory write control circuitry 44 from the description presented above and from the timing diagrams shown in FIGS. 6 and 7.

The samples stored in the memory 42, which represent the reduced size auxiliary image, are retrieved to be combined with the samples representing the main signal under the control of the memory read control circuitry 48. The circuitry 48 is responsive to the main clock signal, MCK, the main vertical and horizontal synchronization signals, MVSYNC and MHSYNC, and the main I clock signal, MIC to provide the samples held in the memory 42 to the multiplexer 16 during a predetermined portion of the main signal line interva over a predetermined portion of the lines in each field of the main image. The memory read control circuitry 48 also conditions the multiplexer 16 to substitute the samples from the memory 42 for samples of the main signal. The samples are read from memory 42 in synchronism with a clock signal, RCLK, which has a frequency of $4f_c$, four times the frequency of the clock signal, WCLK, used to write the samples into the memory 42. Consequently, each line of the auxiliary image, represented by the stored samples, is compressed by a factor of four and the apparent frequency of the color subcarrier signal of the stored signal is multiplied by four (i.e. restored to $f_c$). The memory read control circuitry 48 is conditioned by the main I clock signal, MIC, to substitute the auxiliary samples which have chrominance components at the +I sampling phase for main signal samples which also have chrominance signal components at the +I phase. Accordingly, the chrominance signal components of the main and auxiliary signals are synchronized. The relationship between the input and output signals of the memory read control circuitry 48 are shown in the timing diagrams of FIGS. 6 and 8. One skilled in the art of digital signal processing circuit design would be able to build suitable memory read control circuitry 48 from these timing diagrams and from the description set forth above.

Although the described embodiment of the invention uses a memory 42 which holds only one field, of the reduced size auxiliary signal, it is contemplated that the invention may also be practiced in a video signal processing system which includes a memory for storing one field of the main signal. In a system of this type, the samples representing the reduced size auxiliary image would be stored into predetermined sample locations corresponding to the position of the inset auxiliary image in the reproduced pix-in-pix picture.

What is claimed is:
1. A video signal processing system comprising:
   an input terminal for applying a sampled data signal representing a chrominance signal which includes a baseband color information signal modulating a subcarrier signal having a predetermined frequency, wherein the sampling frequency of said sampled data signal is substantially equal to N times said predetermined frequency, where N is a real number not less than two;
   sample interpolating means, coupled to said input terminal for interpolating between a plurality of selected pairs of samples of said sampled data signal to develop a plurality of interpolated samples; and
   means, coupled to said sample interpolating means, for selecting samples from among said interpolated samples and the samples of said sampled data signal to develop a further sampled data signal representing said color information signal modulating a further subcarrier signal having a frequency that is less than said predetermined frequency.

2. The system set forth in claim 1 wherein said sample interpolating means comprises:
   sample delaying means, coupled to said input terminal, including a plurality of serially connected delay elements for providing, at respective output terminals of successive ones of said delay elements, samples of said sampled data signal that are delayed by successively greater amounts of time;
   first combining means, coupled to said input terminal and to a first selected one of said delay elements for combining the respective sample values provided thereby in a first predetermined proportion to develop a first interpolated sample, wherein the samples available at said input terminal and at said first selected delay element are samples taken at substantially the same sampling phase of said subcarrier signal;

second combining means, coupled to second and third selected delay elements for combining the respective samples provided thereby in a second predetermined proportion to develop a second interpolated sample, wherein the samples provided by said second and third selected delay elements are samples taken at substantially the same sampling phase of said subcarrier signal, which phase differs from the subcarrier sampling phase of the samples available al said input terminal and at said first selected delay element.

3. A video signal processing system comprising:

a source of a video signal including a chrominance signal component occupying a predetermined band of frequencies wherein said chrominance signal component includes a baseband color information signal modulating a subcarrier signal having a predetermined frequency;

means coupled to said source for generating a clock signal having a frequency that is substantially equal to N times said predetermined frequency where N is a real number not less than two;

signal sampling means, coupled to said source and responsive to said clock signal, for developing a sampled data signal representing said video signal and having a sample frequency proportional to the frequency of said clock signal;

filtering means, coupled to said signal sampling means for passing components occupying said predetermined band of frequencies to the relative exclusion of components having frequencies outside of said predetermined band of frequencies;

sample interpolating means, coupled to said filtering means for interpolating between a plurality of selected pairs of samples of said sampled data chrominance signal to develop a plurality of interpolated samples; and means, coupled to said sample interpolating means, for selecting samples from among said interpolated samples and the samples of said sampled data chrominance signal to develop a further sampled data chrominance signal representing said color information signal modulating a further subcarrier signal having a frequency that is less than said predetermined frequency.

4. The system set forth in claim 3 wherein:

said sample interpolating means includes:

sample delaying means, coupled to said filtering means, including a plurality of serially connected delay elements for providing, at respective output terminals of successive ones of said delay elements, samples of said sampled data chrominance signal that are delayed by successively greater amounts of time;

first combining means, coupled to said filtering means and to a first selected one of said delay elements for combining the respective sample values provided thereby in a first predetermined proportion to develop a first interpolated sample, wherein the samples provided by said filtering means and said first selected delay element are samples taken at substantially the same sampling phase of said subcarrier signal;

second combining means, coupled to second and third selected delay elements for combining the samples provided thereby in a second predetermined proportion to develop a second interpolated sample, wherein the samples provided by said second and third selected delay elements are samples taken at substantially the same sampling phase of said subcarrier signal, which phase differs from the subcarrier sampling phase of the samples provided by said filtering means and said first selected delay element; and said sample selecting means includes a multiplexer having first and second signal input terminals coupled to said first and second combining means respectively and responsive to a control signal for providing the respective samples provided by said first and second combining means at an output terminal at respective first and second instants determined by said control signal.

5. The system set forth in claim 4 wherein:

said clock signal has a frequency substantially equal to four times said predetermined frequency;

said signal sampling means develops said sampled data video signal having a sample frequency substantially equal to the frequency of said clock signal;

said sample interpolating means includes:

sample delaying means including first, second, third, fourth, fifth and sixth serially connected delay elements, each of which delays the samples of said sampled data chrominance signal by an amount of time substantially equal to one period of the clock signal;

first combining means, coupled to said filtering means and to said fourth delay element, for combining the respective sample values provided thereby in a ratio of one to three to develop a first interpolated sample;

second combining means, coupled to said first and fifth delay elements, for combining the respective sample values provided thereby in a ratio of one to one to develop a second interpolated sample; and third combining means, coupled to said second and sixth delay elements, for combining the respective sample values provided thereby in a ratio of three to one to develop a third interpolated sample; and said sample selecting means includes:

a multiplexer having first, second, third and fourth input terminals coupled respectively to said third delay element and to said first, second and third combining means and responsive to a control signal for providing sample values applied to said first, second, third and fourth input terminals at an output terminal at instants determined by said control signal; and means for generating said control signal including a modulo 4 counter, coupled to said clock signal generating means for incrementing a count value by one for every four pulses of said clock signal, said count value being applied to said multiplexer as said control signal.

6. In a picture within a picture television signal processing system which generates a pix-in-pix video signal representing the image from an auxiliary video signal reduced in size and inset in the image from a main video signal, apparatus for developing a video signal representing the reduced size auxiliary image comprising:

a source of an auxiliary video signal including a luminance signal component and a chrominance signal component which includes a baseband color information signal modulating a subcarrier signal having a predetermined frequency;

means coupled to said source for generating a clock signal having a frequency that is substantially equal to N times said predetermined frequency where N is a real number not less than two;

signal sampling means, coupled to said source and responsive to said clock signal for developing a sampled data signal representing said auxiliary video signal and having a sample frequency proportional to the frequency of said clock signal;

filtering means, coupled to said signal sampling means for substantially separating the luminance and chrominance signal components from said sampled data auxiliary video signal;

means, coupled to said filtering means for subsampling said luminance signal component in a one to R ratio, where R is an integer greater than one, to generate a subsampled auxiliary luminance signal;

means, coupled to said filtering means for processing said chrominance signal components of said sampled data auxiliary video signal, including:

sample interpolating means, coupled to said filtering means, for interpolating between a plurality of selected pairs of samples of the chrominance signal components of said sampled data auxiliary video signal to develop a plurality of interpolated samples; and means, coupled to said sample interpolating means, for selecting samples from among said interpolated samples and the chrominance signal components of said sampled data auxiliary video signal to develop a sampled data chrominance signal representing said color information signal modulating a further subcarrier signal having a frequency that is 1/R times said predetermined frequency;

means for combining the samples of said subsampled luminance signal and said sampled data chrominance signal to generate a subsampled auxiliary video signal;

means, including a memory, for storing samples of said subsampled auxiliary video signal corresponding to one field of said auxiliary image; and means for retrieving said stored samples from said memory at a sample rate substantially equal to the sample rate of the sampled data auxiliary video signal, provided by said signal sampling means, and for combining said retrieved samples with said main signal to generate said pix-in-pix video signal.

* * * * *